United States Patent
Rao et al.

(10) Patent No.: US 10,754,704 B2
(45) Date of Patent: Aug. 25, 2020

(54) CLUSTER LOAD BALANCING BASED ON ASSESSMENT OF FUTURE LOADING

(71) Applicant: International Business Machines Corporation, Armonk, NY (US)

(72) Inventors: Suryanarayana Rao, Bangalore (IN); Ramesh Chandra Pathak, Bangalore (IN); Sashi Bhusan Jena, Cuttack (IN); Bibhuti B. Mohanty, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 43 days.

(21) Appl. No.: 16/032,248

(22) Filed: Jul. 11, 2018

(65) Prior Publication Data

US 2020/0019444 A1 Jan. 16, 2020

(51) Int. Cl.
*G06F 9/48* (2006.01)
*G06F 9/50* (2006.01)

(52) U.S. Cl.
CPC .......... *G06F 9/5083* (2013.01); *G06F 9/4887* (2013.01); *G06F 9/505* (2013.01); *G06F 9/5016* (2013.01)

(58) Field of Classification Search
CPC ............... G06F 9/505; G06F 2209/501; G06F 2209/5019; G06F 11/3409; G06F 9/4881; G06F 9/5083
See application file for complete search history.

(56) References Cited

U.S. PATENT DOCUMENTS

| | | | |
|---|---|---|---|
| 5,625,811 | A | 4/1997 | Bhide et al. |
| 7,092,985 | B2 | 8/2006 | Hubbard |
| 7,644,137 | B2 | 1/2010 | Bozak et al. |
| 7,849,073 | B2 | 12/2010 | Young-Lai |
| 7,937,377 | B2 | 5/2011 | Wilding et al. |
| 8,073,952 | B2 | 12/2011 | Yoo et al. |
| 8,396,957 | B2 | 3/2013 | Dumitriu et al. |
| 8,700,876 | B2 | 4/2014 | Shah et al. |
| 8,826,367 | B2 | 9/2014 | Srivastava et al. |

(Continued)

FOREIGN PATENT DOCUMENTS

| | | |
|---|---|---|
| CN | 101859317 A | 10/2010 |
| EP | 0518574 A2 | 12/1992 |

(Continued)

*Primary Examiner* — Dong U Kim
(74) *Attorney, Agent, or Firm* — William H. Hartwell; Maxine L. Barasch; Keohane & D'Alessandro, PLLC

(57) ABSTRACT

Disclosed embodiments provide techniques for load balancing of computer jobs in a distributed computer network. A health score is determined for each node of the pool of nodes, which can include native applications, virtual machines, and/or containers. A future resource availability score is determined for each node of the pool of nodes corresponding with a predetermined future time. A schedule eligibility score is computed for each node based on the health score and future resource availability score. A new job is assigned to the node with the optimal schedule eligibility score. In this way, rather than only considering the current workload conditions of the node, a future resource availability score is computed for each node, and this score is used as a factor in the assigning of jobs to the node. This provides an opportunity for improved resource utilization and improved overall system reliability.

19 Claims, 9 Drawing Sheets

(56) References Cited

U.S. PATENT DOCUMENTS

| | | |
|---|---|---|
| 9,424,288 B2 | 8/2016 | Suleiman et al. |
| 9,542,219 B1* | 1/2017 | Bryant ................ G06F 9/45558 |
| 9,813,491 B2 | 11/2017 | Glover et al. |
| 2002/0194015 A1 | 12/2002 | Gordon et al. |
| 2004/0047354 A1* | 3/2004 | Slater .................. H04L 41/0896 |
| | | 370/400 |
| 2004/0186897 A1* | 9/2004 | Knauerhase ............ H04L 67/16 |
| | | 709/209 |
| 2005/0033818 A1 | 2/2005 | Jardin |
| 2005/0114862 A1 | 5/2005 | Bisdikian et al. |
| 2008/0172673 A1* | 7/2008 | Naik ....................... G06F 9/505 |
| | | 718/104 |
| 2008/0222646 A1* | 9/2008 | Sigal ....................... G06F 9/505 |
| | | 718/105 |
| 2009/0037367 A1 | 2/2009 | Wein |
| 2012/0060212 A1* | 3/2012 | Inoue .................... G06F 9/5038 |
| | | 726/14 |
| 2014/0146961 A1 | 5/2014 | Ristock et al. |
| 2015/0082432 A1* | 3/2015 | Eaton .................... H04L 47/785 |
| | | 726/23 |
| 2015/0333988 A1* | 11/2015 | Jalan ................... H04L 43/0817 |
| | | 709/224 |
| 2015/0371355 A1* | 12/2015 | Chen ........................ G06T 1/20 |
| | | 345/505 |
| 2016/0036924 A1 | 2/2016 | Koppolu et al. |
| 2016/0098292 A1* | 4/2016 | Boutin .................... G06F 9/505 |
| | | 718/104 |
| 2016/0380906 A1* | 12/2016 | Hodique ................. H04L 47/70 |
| | | 709/226 |
| 2017/0010920 A1* | 1/2017 | Abouzour ............. G06F 9/5044 |
| 2017/0060642 A1* | 3/2017 | Castellano ............. G06F 9/5077 |
| 2018/0260746 A1* | 9/2018 | Xiong ................ G06Q 10/0631 |
| 2019/0041457 A1* | 2/2019 | Krishnan ............ G06F 11/3409 |

FOREIGN PATENT DOCUMENTS

| | | |
|---|---|---|
| WO | 2005024669 A1 | 3/2005 |
| WO | 2013152216 A1 | 10/2013 |
| WO | 2014122555 A1 | 8/2014 |

* cited by examiner

FIG. 9

| NODE | CPU IDLE | MEM AVAIL | UPTIME | PENALTY | Health Score |
|---|---|---|---|---|---|
| 1 | 25 | 60 | 600 | 0 | 85 |
| 2 | 50 | 60 | 300 | 1 | 60 |
| 3 | 70 | 60 | 40000 | 0 | 130 |
| 4 | 50 | 30 | 60000 | 1 | 30 |
| 5 | 60 | 60 | 1000 | 0 | 120 |
| 6 | 60 | 60 | 400 | 1 | 70 |
| 7 | 25 | 60 | 600 | 0 | 85 |

FIG. 10

| NODE | FRAS |
|---|---|
| 1 | 30 |
| 2 | 60 |
| 3 | 50 |
| 4 | 80 |
| 5 | 70 |
| 6 | 10 |
| 7 | 25 |

FIG. 11

| NODE | SES |
|---|---|
| 1 | 115 |
| 2 | 120 |
| 3 | 180 |
| 4 | 110 |
| 5 | 190 |
| 6 | 80 |
| 7 | 110 |

CLUSTER LOAD BALANCING BASED ON ASSESSMENT OF FUTURE LOADING

FIELD

The present invention relates generally to computer systems and, more particularly, to cluster load balancing.

BACKGROUND

Load balancing involves techniques for distributing incoming computer jobs or tasks across a group of distributed nodes, such as implemented in a server farm or server pool. Modern enterprise-level applications service many thousands of concurrent requests from users or clients and need to process these requests in a fast and reliable manner. In order to scale to meet the demand, modern computing best practices generally require adding more servers. Each server may then in turn operate one or more native applications, virtual machines, and/or containerized environments to implement the desired functionality. The load balancer serves as a job dispatcher to route job requests across the pool of servers/nodes capable of fulfilling those requests. As applications continue to increase in size and scope, it is important to have effective load balancing to maintain high availability and efficient utilization of computer resources.

SUMMARY

In one embodiment, there is provided a computer-implemented method for load balancing of computer jobs in a distributed computer network, the distributed computer network comprising a plurality of nodes, the method comprising: determining a health score for each node of the plurality of nodes; determining a future resource availability score for each node of the plurality of nodes corresponding with a predetermined future time; computing a schedule eligibility score for each node based on the health score and future resource availability score; and assigning a new job to the node with the optimal schedule eligibility score.

In another embodiment, there is provided an electronic computing device, comprising: a processor; a memory coupled to the processor, the memory containing instructions, that when executed by the processor, perform the steps of: determining a health score for each node of a plurality of nodes; determining a future resource availability score for each node of the plurality of nodes corresponding with a predetermined future time; computing a schedule eligibility score for each node based on the health score and future resource availability score; and assigning a new job to the node with the optimal schedule eligibility score.

In yet another embodiment, there is provided a computer program product for an electronic computing device comprising a computer readable storage medium having program instructions embodied therewith, the program instructions executable by a processor to cause the electronic computing device to: determine a health score for each node of the plurality of nodes; determine a future resource availability score for each node of the plurality of nodes corresponding with a predetermined future time; compute a schedule eligibility score for each node based on the health score and future resource availability score; and assign a new job to the node with the optimal schedule eligibility score.

BRIEF DESCRIPTION OF THE DRAWINGS

Features of the disclosed embodiments will be more readily understood from the following detailed description of the various aspects of the invention taken in conjunction with the accompanying drawings.

FIG. 9 is a table showing exemplary node health data.

FIG. 10 is a table showing exemplary future resource availability score data.

FIG. 11 is a table showing exemplary schedule eligibility score data.

Figure 1:
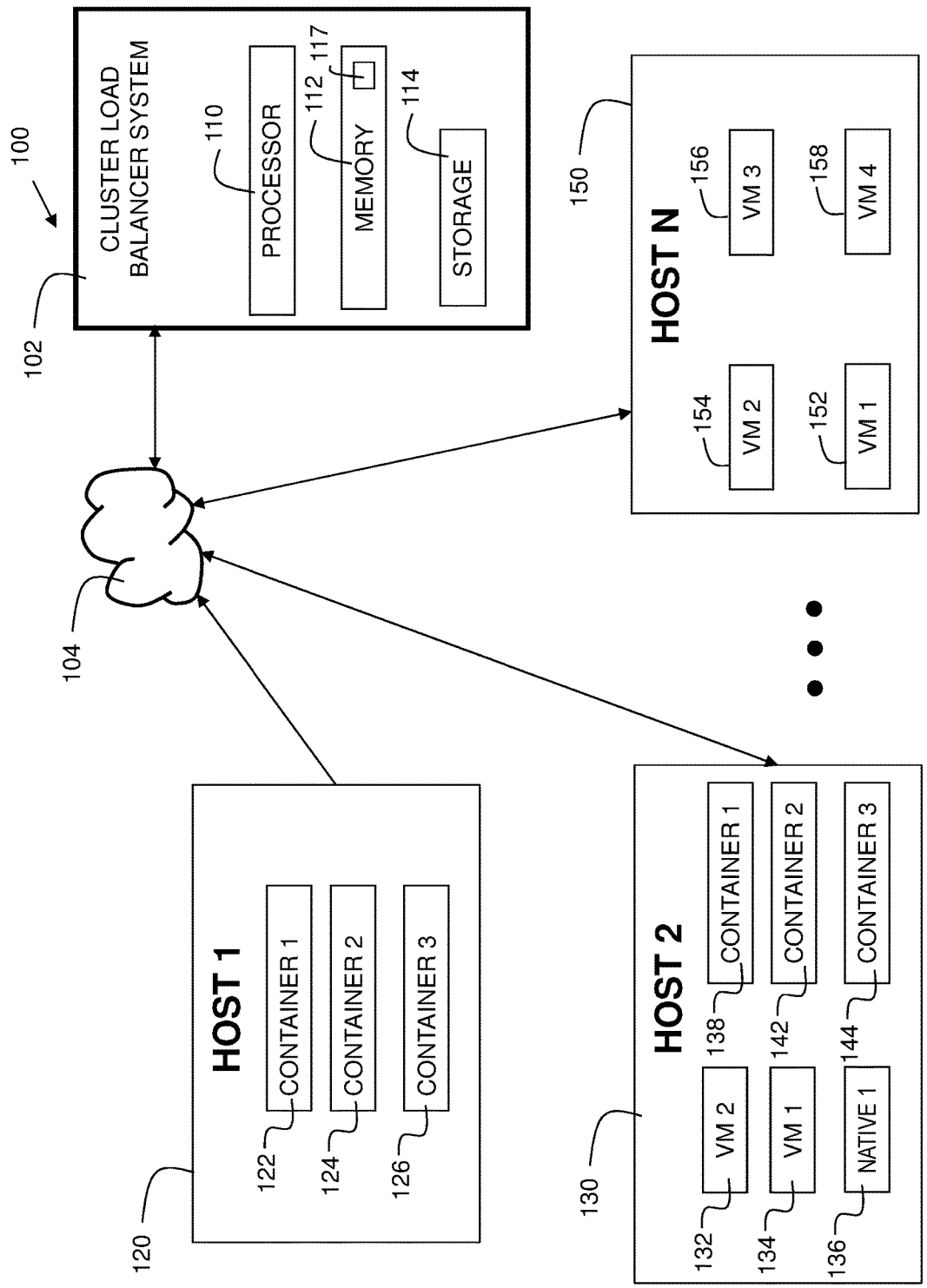
FIG. 1 shows an environment for embodiments of the present invention.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the Figures may be omitted, or illustrated not-to-scale, for illustrative clarity.

DETAILED DESCRIPTION

Disclosed embodiments provide techniques for load balancing of computer jobs in a distributed computer network. A health score is determined for each node of the pool of nodes, which can include native applications, virtual machines, and/or containers. A future resource availability score is determined for each node of the pool of nodes corresponding with a predetermined future time. A schedule eligibility score is computed for each node based on the health score and future resource availability score. A new job is assigned to the node with the optimal schedule eligibility score. In this way, rather than only considering the current workload conditions of the node, a future resource availability score is computed for each node, and this score is used as a factor in the assigning of jobs to the node. This provides an opportunity for improved resource utilization and improved overall system reliability.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, or elements.

FIG. 1 shows an environment 100 for embodiments of the present invention. Cluster load balancer system 102 includes a processor 110, memory 112, and storage 114. Memory 112 stores instructions, which when executed by the processor, cause system 102 to implement embodiments of the present invention. System 102 is connected to network 104. Network 104 is the Internet, a wide area network, local area network, or other suitable network.

Three computers that implement a cluster of nodes are shown also connected to the network. These computers are Host 1 120, Host 2 130, and Host N 150. Host 1 120, Host 2 130, and Host N 150 are computer systems (host machines) which may include thereon one or more containers, one or more virtual machines (VMs), or one or more native applications. These host machines are typically self-sufficient, including a processor (or multiple processors), memory, and instructions thereon. Host 1 120, Host 2 130, and Host N 150 are each computers that together implement a cluster.

Host 1 includes instances of three containers: Container 1 122, Container 2 124, and Container 3 126. A container image is a lightweight, stand-alone, executable package of software that includes everything needed to perform a role that includes one or more tasks. The container can include code, runtime libraries, system tools, system libraries, and/or configuration settings. Containerized software operates with some independence regarding the host machine/environment. Thus, containers serve to isolate software from their surroundings.

Host 2 130 includes instances of virtual machines, containers, and a native application. The containers are Container 1 138, Container 2 142, and Container 3 144. The Native 1 136 is a native application, operating system, native instruction set, or other native program that is implemented specially for the particular model of the computer or microprocessor, rather than in an emulation or compatibility mode. The virtual machines are VM 2 132 and VM 1 134.

Host N includes instances of four virtual machines: VM 2 154, VM 1 152, VM 3 156, and VM 4 158. A virtual machine (VM) is an operating system or application environment that is installed as software, which imitates dedicated hardware. The virtual machine imitates the dedicated hardware, providing the end user with the same experience on the virtual machine as they would have on dedicated hardware.

Accordingly, in some embodiments, hosts can include only a single type of environment, such as containers, virtual machines, or native applications. Alternatively, a host can include a plurality of such, like in the example of Host 2. In some cases, instances of the container, virtual machine, or native application may be replicated on more than one host. This is shown here as first instances of Container 1 122, Container 2 124, and Container 3 126 on Host 1 120, and second instances of each are Container 1 138, Container 2 142, and Container 3 144 on Host 2. In addition, first instances of VM 2 132 and VM 1 134 are on Host 2 130, and second instances of VM 2 154 and VM 1 152 are on Host N 150.

The cluster in the example is managed by cluster load balancer system 102. System 102 may use one or more programs to deploy, scale, and manage machines and software in the cluster as an orchestration environment. Non-limiting examples of such programs/systems are Kubernetes, Apache Hadoop, and Docker. Applications operating on such a system can include database application such as Oracle database systems utilizing structured query language (SQL) databases. Note that the terms "KUBERNETES", "ORACLE", "APACHE", "HADOOP", and "DOCKER" may each be subject to trademark rights in various jurisdictions throughout the world. Each is used here only in reference to the products or services properly denominated by the mark to the extent that such trademark rights may exist.

Figure 2:
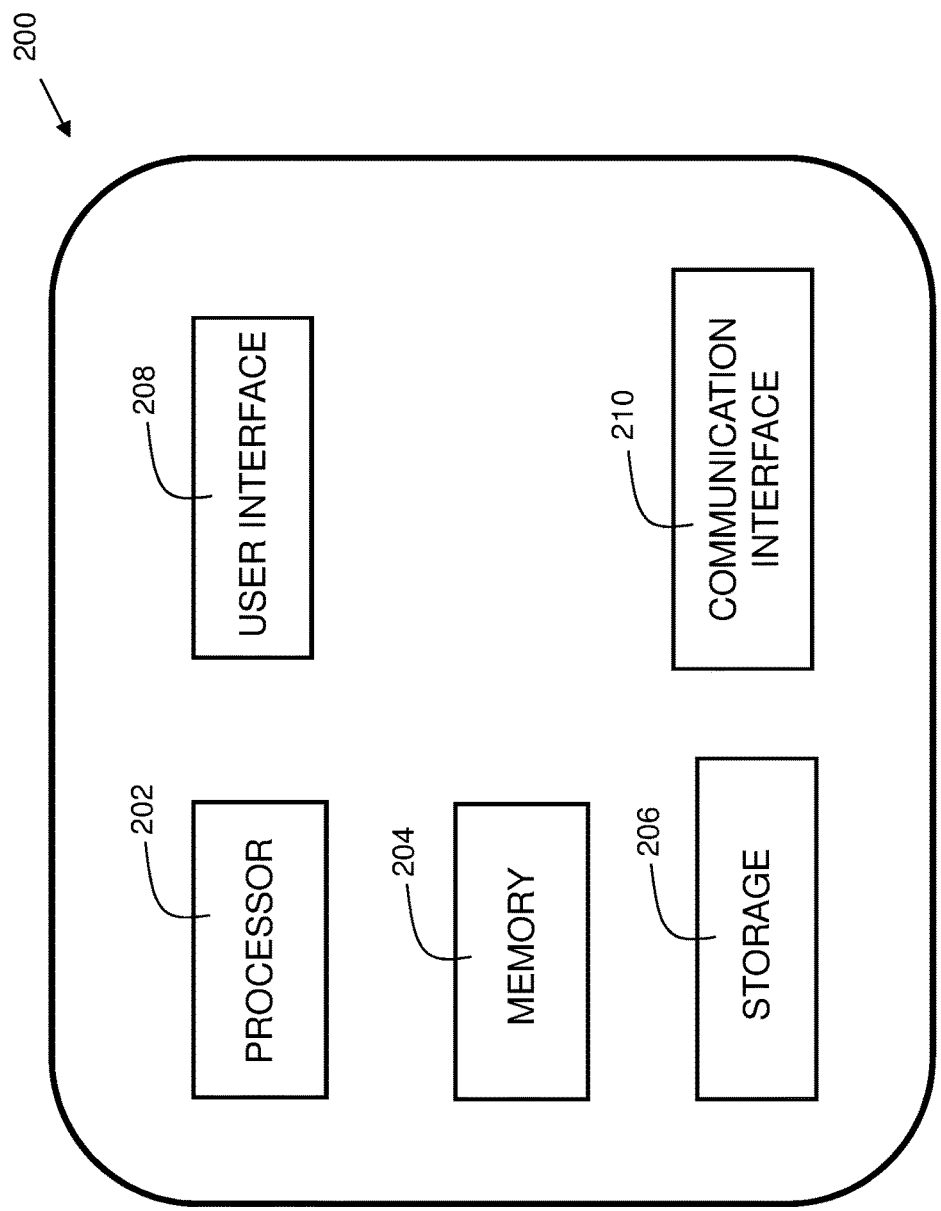
FIG. 2 is a block diagram of an electronic computing device in accordance with embodiments of the present invention.

FIG. 2 is a block diagram of an electronic computing device 200 in accordance with embodiments of the present invention. This represents any of a host machine (120, 130, 150) or system 102 of FIG. 1. Device 200 includes a processor 202, which is coupled to a memory 204. Memory 204 may include dynamic random-access memory (DRAM), static random-access memory (SRAM), magnetic storage, and/or a read only memory such as flash, EEPROM, optical storage, or other suitable memory. In some embodiments, the memory 504 may not be a transitory signal per se.

In some embodiments, device 200 further includes storage 206. In embodiments, storage 206 may include one or more magnetic storage devices such as hard disk drives (HDDs). Storage 206 may additionally include one or more solid state drives (SSDs).

Device 200, in some embodiments, includes a user interface 208. This includes a display, keyboard, mouse, or other suitable interface. In some embodiments, the display may be touch-sensitive. The user interface 208 is an optional component, and may not be present in some implementations.

In some embodiments, the device 200 further includes a communication interface 210. The communication interface 210 may be a wired communication interface that includes Ethernet, Gigabit Ethernet, or the like. In embodiments, the communication interface 210 may include a wireless communication interface that includes modulators, demodulators, and antennas for a variety of wireless protocols including, but not limited to, Bluetooth™, Wi-Fi, and/or cellular communication protocols for communication over a computer network.

Figure 3:
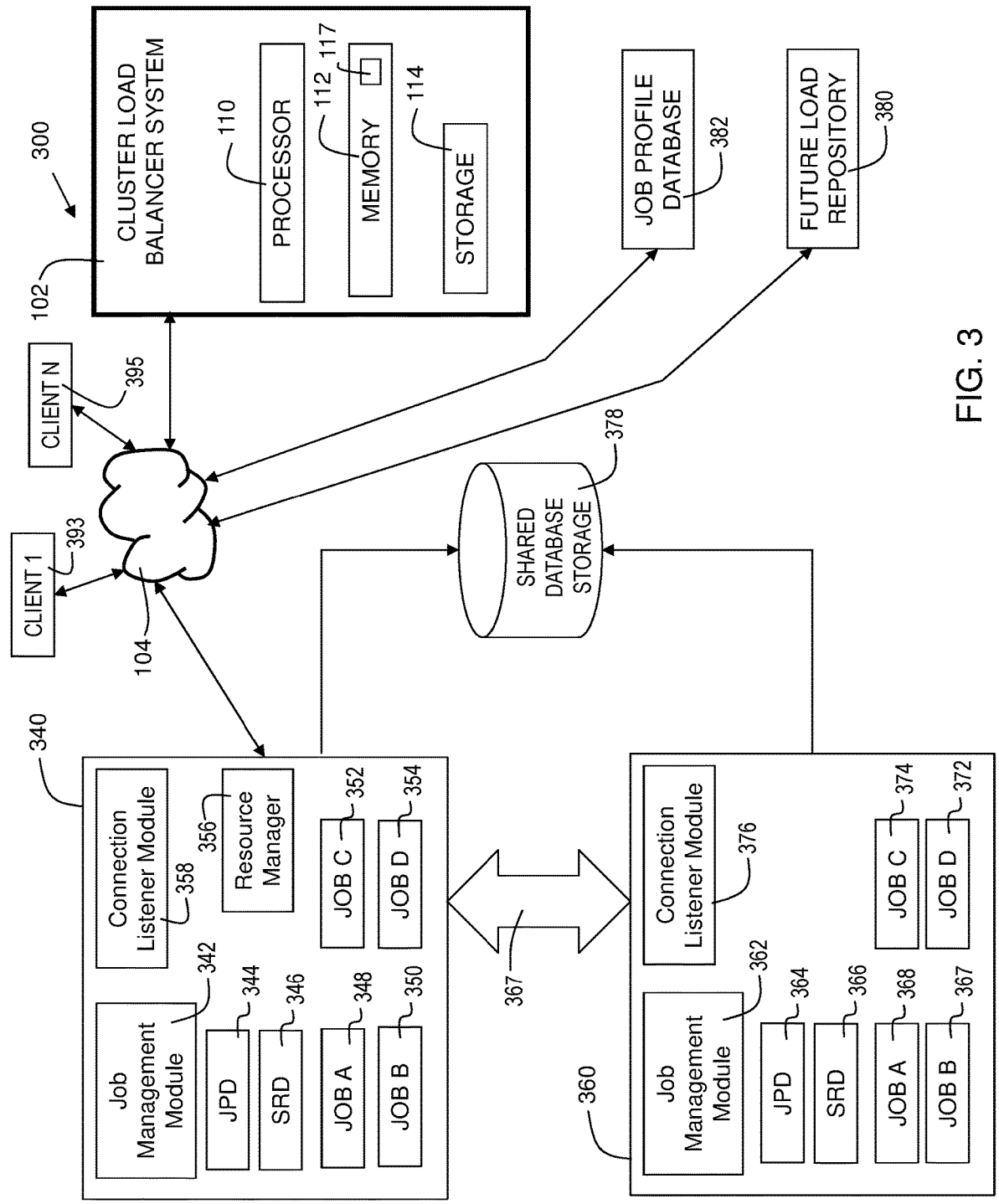
FIG. 3 shows an exemplary embodiment of the present invention in a database cluster environment.

FIG. 3 shows an exemplary embodiment 300 of the present invention in a database cluster application. System 102 includes a processor 110, memory 112, and storage 114. Memory 112 stores instructions 117, which when executed by the processor, cause system 102 to implement embodiments of the present invention. System 102 is connected to network 104. Network 104 can be the Internet, a wide area network, local area network, or other suitable network.

Client 1 393 and Client N 395 are connected to network 104. Client devices may be mobile devices such as smartphones, tablet computers, laptop computers, PDAs, etc. Client devices may also be desktop computers, or another suitable computing device.

Cluster 340 is connected to network 104 as well. Cluster 360 is in communication with Cluster 340 via cluster interconnect 367. This is a high-speed interface between clusters. This high-speed interface can include a dedicated local area network with standalone dedicated switches, or virtual local area network dedicated to interconnect traffic. Each of cluster 340 and 360 are connected to shared database storage 378. This can be a raid disk cluster, cloud storage, replicated memory devices, etc.

Cluster 340 and cluster 360 have a job management module 342 and job management module 362 respectively. Each of these is a service that allocates resources for jobs. Cluster 340 and cluster 360 have connection listener module 358 and connection listener module 376, respectively. These are modules to facilitate communication with system 102. Cluster 340 and cluster 360 have job profile daemon 344 and job profile daemon 364, respectively. These provide estimates on time remaining for each job. Cluster 340 and cluster 360 have service resource daemon 346 and service resource daemon 366, respectively. These provide resource utilization information for each job (memory, CPU, number of processes, etc.).

Cluster 340 further includes a resource manager 356. This module is present on a database cluster acting as a master node to coordinate with role nodes (e.g., 360).

Each cluster is executing a set of jobs. Cluster 340 is executing a first set of jobs including Job A 348, Job B 350, Job C 352, and Job D 354. Cluster 360 is executing a second set of jobs including Job A 368, Job B 367, Job C 374, and Job D 372. In embodiments, these jobs can be processing, encrypting, indexing, sorting, searching, or other suitable computerized job. Although in the example, each cluster is shown executing four jobs, in implementations, more or fewer job may be included.

Job profile database 382 is connected to network 104. This database stores historical data on time required to complete recurring jobs. It may use a job identifier to track jobs in association with time. The identifier may be an alphanumeric symbolic set of characters or other suitable unique identifier system. In some embodiments, procedure estimated completion times are stored in this database.

Future load repository 380 is also connected to network 104. This includes a queue of upcoming jobs to be dispatched, based on activity/requests generated from clients 393 and 395 and/or other remote computing devices.

Figure 4:
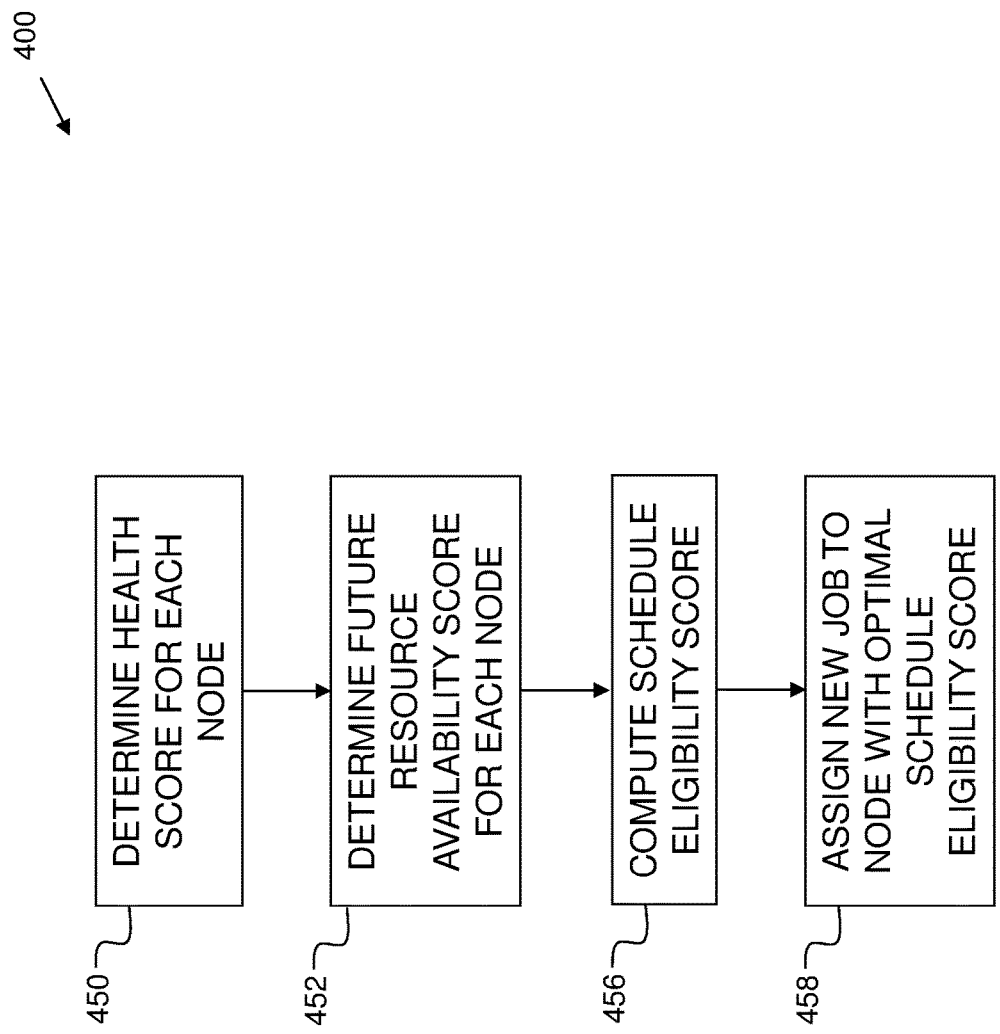
FIG. 4 is a flowchart indicating process steps for embodiments of the present invention.

FIG. 4 is a flowchart 400 indicating process steps for embodiments of the present invention. At 450, a health score is determined for each node of the plurality of nodes. In embodiments, determining a health score for each node comprises determining a current processor utilization and a current memory utilization. At 452, a future resource availability score is determined for each node of the plurality of nodes corresponding with a predetermined future time. A node may be busy, but if it will free up within a reasonable time period, a job can still be queued for that node. At 456, a schedule eligibility score is computed. This score is computed based on the health score and the future resource availability score. At 458, a new job is assigned to the node with the optimal schedule eligibility score.

Figure 5A:
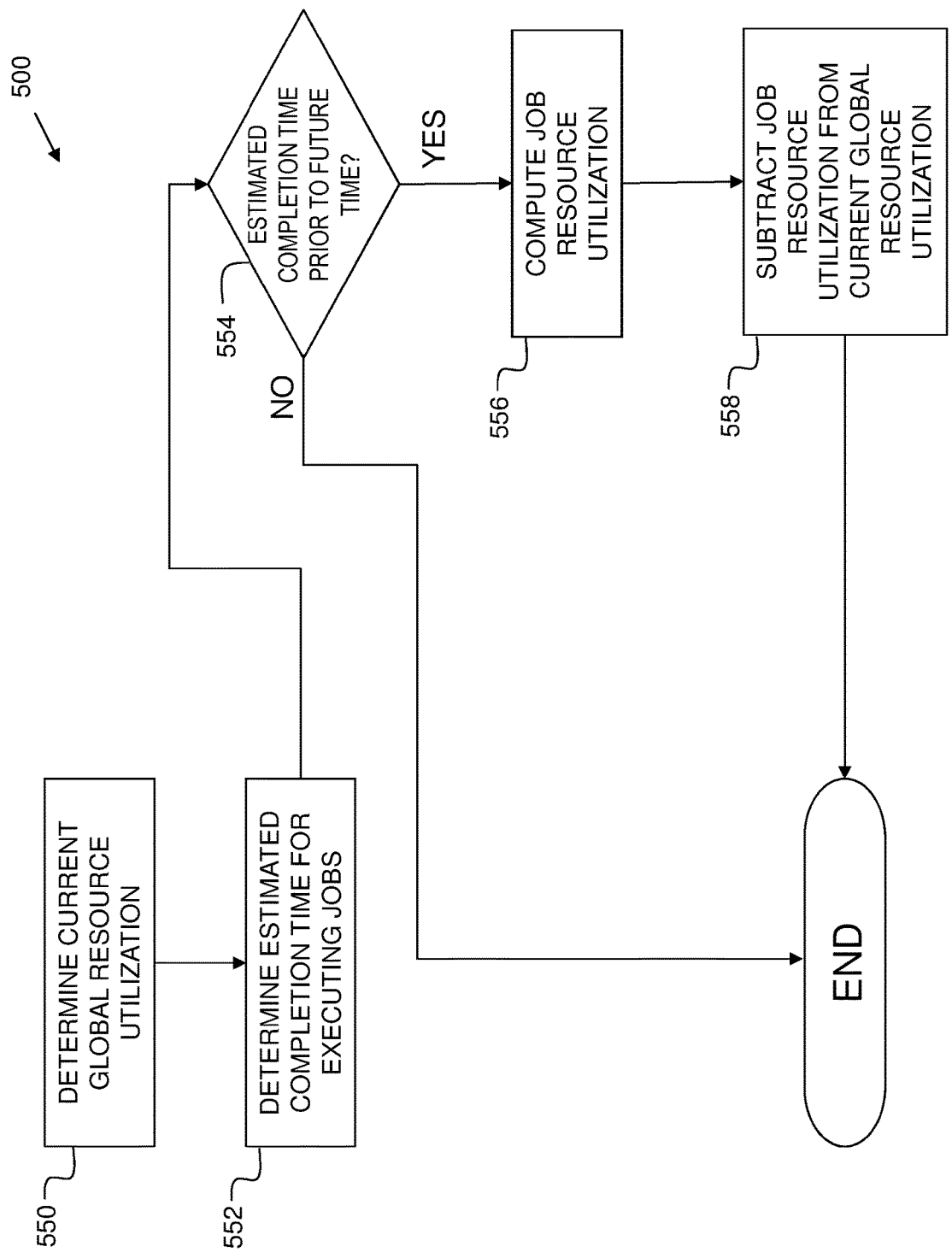
FIG. 5A is a flowchart indicating additional process steps for embodiments of the present invention.
Figure 5B:
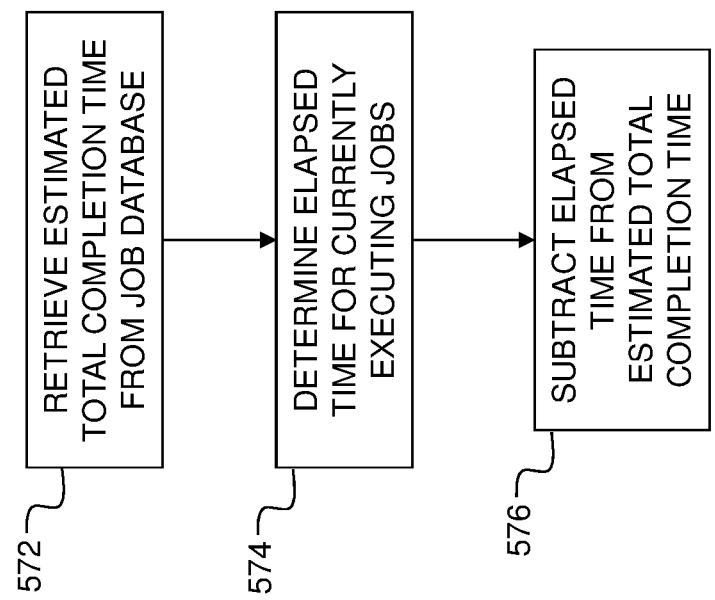
FIG. 5B is a flowchart indicating additional process steps for embodiments of the present invention.

FIG. 5A is a flowchart 500 indicating additional process steps for embodiments of the present invention for computing a future resource availability score (FRAS). At 550, a current global resource utilization is determined for each node of the plurality of nodes. The global resource utilization is a measure of computing resources consumed by all jobs currently executing on the node. These computing resources can include, but are not limited to, CPU availability, amount of free memory, amount of free storage, and/or available network bandwidth. At 552, an estimated completion time is determined for one or more currently executing jobs on each node of the plurality of nodes. In embodiments, determining an estimated completion time for one or more currently executing jobs comprises determining a stored procedure estimated completion time (such as from Job Profile Database 382 of FIG. 3). In some embodiments, determining an estimated completion time for one or more currently executing jobs comprises the following sub-steps shown in flowchart 501 of FIG. 5B. At 572, an estimated total completion time for the one or more currently executing jobs is retrieved from a job completion database. At 574, an elapsed time is determined for the one or more currently executing jobs. At 576, the elapsed time is subtracted from the estimated total completion time, resulting in the estimated completion time.

At 554, it is determined whether the estimated completion time is prior to a predetermined future time. If no, the process ends. If yes, at 556, for each of the one or more currently executing jobs that has an estimated completion time that is prior to the predetermined future time, a job resource utilization is computed. The job resource utilization is a measure of the amount of computing resources required to execute a given job. The computing resources can include, but are not limited to, CPU availability, available memory, available storage, and/or available network bandwidth. At 558, the job resource utilization is subtracted from the current global resource utilization for each of the one or more currently executing jobs on each node of the plurality of nodes to derive a future resource availability score for each node of the plurality of nodes. The process then ends.

Figure 6:
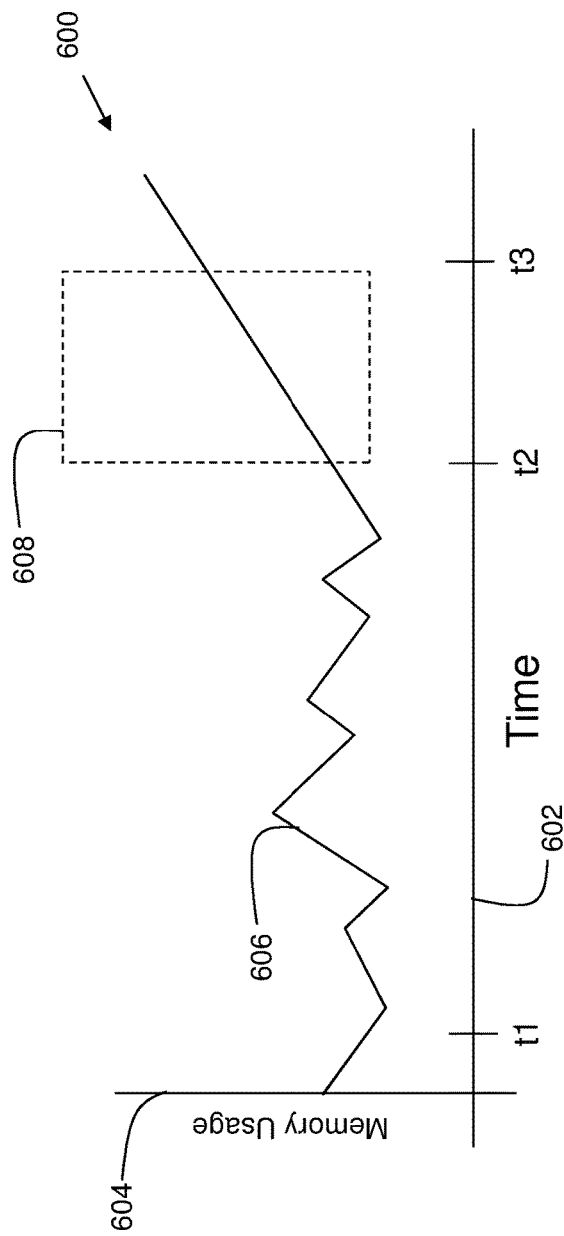
FIG. 6 is a graph indicating an increasing memory gradient for a node.

FIG. 6 is a graph 600 indicating an increasing memory gradient for a node. The graph 600 shows memory usage on the y-axis 604 over time on the x-axis 602. Line 606 shows the memory usage increasing and decreasing slightly between t1 and t2. Line 606 though shows a possible memory leak at 608 because of the memory gradient present. This means that the computer may need to be rebooted or troubleshooting may need to be performed, indicating that it is not advisable to assign a job to that node at this time. In some embodiments, the determining a health score for each node further comprises determining a memory gradient for each node, and penalizing the health score for an increasing memory gradient.

Figure 7:
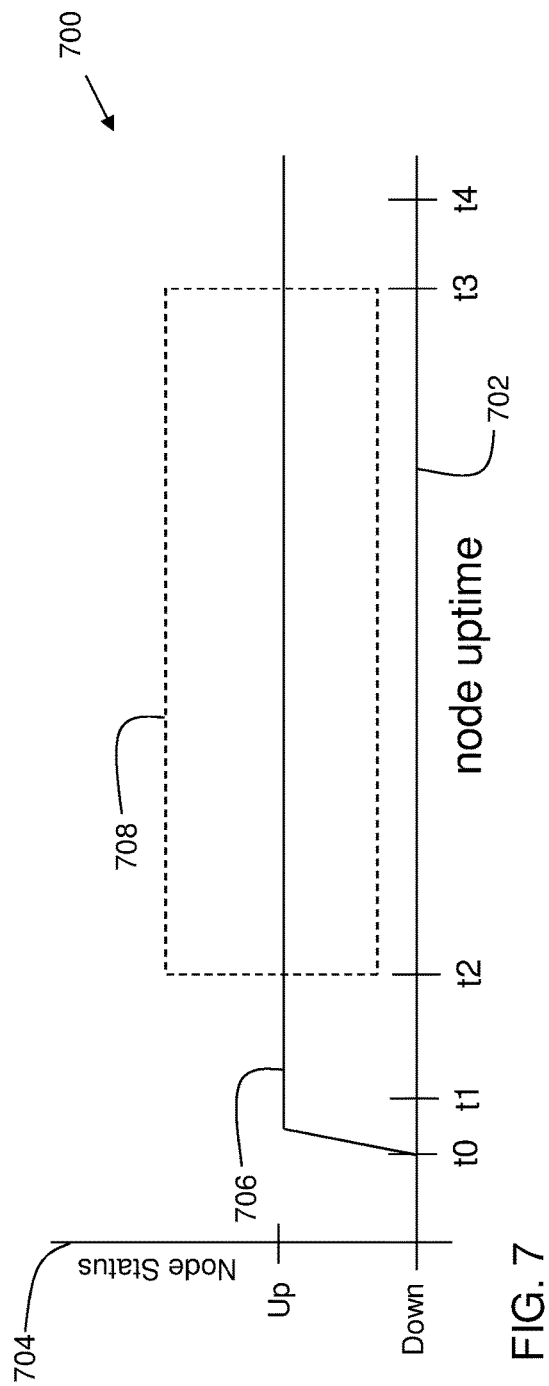
FIG. 7 shows an exemplary predetermined optimal uptime window for a node.

FIG. 7 shows a graph 700 including an exemplary predetermined optimal uptime window for a node. Line 706 shows the amount of uptime over time. The y-axis 704 represents node status. A status of "down" indicates the node is not operational. A status of "up" indicates the node is completely booted and operational. In the example, the optimal uptime window 708 is between t2 and t3 along x-axis 702. This may be determined based on how long the node has been up and running. Prior to t2, in the example, there is not sufficient uptime to determine the stability of the node, and after t3, there is excessive uptime, where instability due to memory leaks can cause reliability issues. Accordingly, embodiments can include determining a node uptime for each node and penalizing the health score in response to the node uptime being outside of a predetermined optimal uptime window. In some embodiments, the predetermined optimal uptime window lower limit is 500, and the predetermined optimal uptime window upper limit is 44,000 seconds. This is an example range, and any suitable range is included within the scope of the invention.

Figure 8:
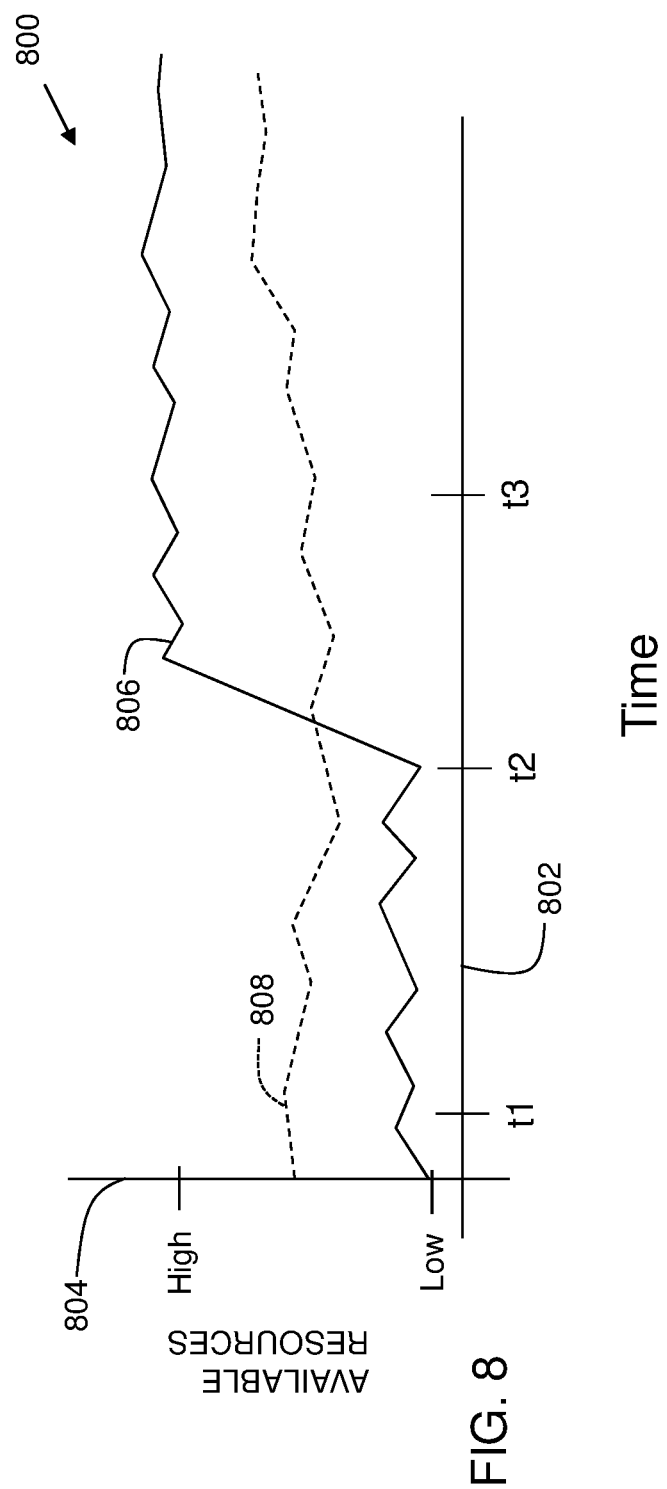
FIG. 8 is a graph indicating an exemplary future resource availability for nodes.

FIG. 8 is a graph 800 indicating an exemplary future resource availability for nodes. The graph 800 shows available resources on the y-axis 804 over time on the x-axis 802. Resource availability is shown for two nodes. Resource availability for a first node is shown in solid line 806, and resource availability for a second node is indicated in the dashed line 808. At t1, the second node appears to have greater resource availability than the first node. The first node is currently executing jobs that require a greater amount of resources than the jobs the second node is executing. An estimated completion time is determined for the one or more currently executing jobs on each node. The estimated completion time for much of the jobs on the first node is t2, whereas the estimated completion time for the jobs on the second node is much further out. It is determined whether the estimated completion time is less than a predetermined future time. In some embodiments, the predetermined future time ranges from 60 seconds to 360 seconds, or other suitable range. In the example here, the predetermined future time is 90 seconds, which corresponds to t3.

For each of the one or more currently executing jobs that has an estimated completion time that is prior to the predetermined future time, a job resource utilization is computed. The job resource utilization is subtracted from the current global resource utilization for each of the one or more currently executing jobs on each node of the plurality of nodes to derive a future resource availability score for each node of the plurality of nodes. Here, it is calculated that the future resource availability score of the first node (indicated by line 806) is greater than the future availability score of the second node (indicated by line 808). Embodiments predict that the first node will finish much of the jobs prior to the predetermined future time of t3, and its resource availability will increase significantly. The second node is predicted to continue to execute jobs requiring a steady amount of resources. Accordingly, at t3, the first node is predicted to have greater resource availability than the second node. Therefore, the load balancer assigns a new job for execution to the first node even though at the time of assignment, that node has less resource availability than the second node.

FIG. 9 is a table 900 showing exemplary node health data. In the example, there are 7 nodes identified in column 902. They include Node 1 at row 911, Node 2 at row 912, Node 3 at row 913, Node 4 at row 914, Node 5 at row 915, Node 6 at row 916, and Node 7 at row 917. For each node, CPU idle percentage is indicated in column 904 and memory availability is indicated in column 906. Uptime is indicated in column 908. Penalty is indicated in column 910. In embodiments, the penalty is a factor of uptime. If the uptime is below a lower limit predetermined value or above an upper limit predetermined value, then a penalty is assessed, indicating possible lowered reliability of a node. For a node that recently completed its boot sequence and has an uptime below the lower limit predetermined value, it is not yet known if the node is stable. For a node that has a very long uptime that exceeds the upper limit predetermined value, issues such as memory leaks can degrade stability. The use of the penalty accounts for these issues in deriving the health score. In some embodiments, the penalty can additionally/alternatively be applied due to an increasing memory gradient as shown in FIG. 6. The computed health score (HS) is indicated in column 922. In an example, the health score is computed as follows:

Health Score(HS)=CPU Idle+Memory Avail−K*Penalty

In the example, K is 50. Note that K is a constant, and can be set to whichever value the administrator finds appropriate. The penalty is computed as 1 if uptime is outside of the predetermined optimal uptime window. In the example, that window is between 500 and 44,000 seconds. So, outside of the window would be less than 500 or greater than 44,000 seconds. The penalty is 0 if uptime is within the predetermined optimal uptime window. Note that this window and the penalty calculation are examples, and any suitable window and penalty computation are included within the scope of the invention.

FIG. 10 is a table 1000 showing exemplary future resource availability score data. The table has two columns: node 1002 and future resource availability score (FRAS) 1004. The FRAS is shown for each of the seven nodes. Node 1 has an FRAS of 30 at row 1011; node 2 has an FRAS of 60 at column 1012; node 3 has an FRAS of 50 at row 1013; node 4 has an FRAS of 80 at row 1014; node 5 has an FRAS of 70 at row 1015; node 6 has an FRAS of 10 at row 1016; and node 7 has an FRAS of 25 at row 1017. Accordingly, nodes 4 and 5 have the greatest FRAS while node 6 has the least.

FIG. 11 is a table 1100 showing exemplary schedule eligibility score data. In the example, schedule eligibility score (SES) is calculated as follows:

SES=HS+FRAS

In the example, for each node shown in column 1102, the health score of FIG. 9 and the FRAS of FIG. 10 are added to calculate SES as shown in column 1104. Accordingly, node 1 has an SES of 115 at row 1111; node 2 has an SES of 120 at row 1112; node 3 has an SES of 180 at row 1113; node 4 has an SES of 110 at row 1114; node 5 has an SES of 190 at row 1115; node 6 has an SES of 80 at row 1116; and node 7 has an SES of 110 at row 1117. In this example, the constants are tuned such that a score above 150 is preferable to be a candidate to receive a new job. A score of less than 120 is preferable to avoid scheduling if possible. Therefore, in the example, nodes 3 and 5 are given top priority for assignment of jobs, while nodes 1, 6, and 7 should be avoided if possible. The schedule eligibility scores are periodically recomputed by system 102 (FIG. 1), and so at some future time, if score on node 1 goes up to 160, as an example, then it may be prioritized for scheduling of a new job on it.

As can now be appreciated, disclosed embodiments provide improvements in the technical field of load balancing of computer jobs in a distributed computer network. By considering the estimated future resource availability of a node, the load balancing efficiency can be enhanced. This provides numerous potential benefits in a cluster computing environment. Disclosed embodiments can be utilized in a variety of organizations, providing database services/products in areas such as product enhancement, monitoring, and diagnostics. Embodiments can include presenting the summary information and/or a detailed report either for one database or for all databases within a cluster. This can greatly reduce problem investigation time from hours and days to minutes. Furthermore, correct job placement can reduce capacity and performance cost. Additionally, with disclosed embodiments, resource efficiency potentially improves and the number of outstanding issues in a cluster computing environment can be drastically reduced.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, location determination and alert message and/or coupon rendering may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a standalone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the disclosure outlines exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with embodiments of the present invention. Furthermore, the methods according to embodiments of the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of embodiments of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of embodiments of the invention.

What is claimed is:

1. A computer-implemented method for load balancing of computer jobs in a distributed computer network, the distributed computer network comprising a plurality of nodes, the method comprising:
   determining a health score for each node of the plurality of nodes,
      wherein the health score is calculated by multiplying a constant by a penalty, and by subtracting the result of the multiplying from a value that is based, at least in part, on central processing unit idle percentage and memory availability,
      wherein the constant is set by an administrator input, and
      wherein the penalty is based, at least in part, on whether uptime is within a predetermined optimal uptime window;
   determining a future resource availability score for each node of the plurality of nodes corresponding with a predetermined future time, wherein the predetermined future time ranges from 60 seconds to 360 seconds;
   computing a schedule eligibility score for each node based on the health score and future resource availability score;
   prioritizing the plurality of nodes based on the schedule eligibility scores; and
   assigning a new job to a node with an assigned priority higher than other nodes of the plurality of nodes.

2. The method of claim 1, wherein determining a future resource availability score for each of the plurality of nodes comprises:
   determining a current global resource utilization for each node of the plurality of nodes;
   determining an estimated completion time for one or more currently executing jobs on each node of the plurality of nodes;
   for each of the one or more currently executing jobs that has an estimated completion time that is less than the predetermined future time, computing a job resource utilization; and
   subtracting the job resource utilization from the current global resource utilization for each of the one or more currently executing jobs on each node of the plurality of nodes to derive a future resource availability score for each node of the plurality of nodes.

3. The method of claim 2, wherein determining a health score for each node comprises determining a current processor utilization and a current memory utilization.

4. The method of claim 3, wherein determining a health score for each node further comprises determining a memory gradient for each node and penalizing the health score for an increasing memory gradient.

5. The method of claim 2, further comprising determining a node uptime for each node, and penalizing the health score in response to the node uptime being outside of the predetermined optimal uptime window.

6. The method of claim 2, wherein determining an estimated completion time for one or more currently executing jobs comprises determining a stored procedure estimated completion time.

7. The method of claim 2, wherein determining an estimated completion time for one or more currently executing jobs comprises:
- retrieving an estimated total completion time for the one or more currently executing jobs from a job completion database;
- determining an elapsed time for the one or more currently executing jobs; and
- subtracting the elapsed time from the estimated total completion time.

8. An electronic computing device, comprising:
- a processor;
- a memory coupled to the processor, the memory containing instructions, that when executed by the processor, perform the steps of:
- determining a health score for each node of the plurality of nodes,
  - wherein the health score is calculated by multiplying a constant by a penalty, and by subtracting the result of the multiplying from a value that is based, at least in part, on central processing unit idle percentage and memory availability,
  - wherein the constant is set by an administrator input, and wherein the penalty is based, at least in part, on whether uptime is within a predetermined optimal uptime window;
- determining a future resource availability score for each node of the plurality of nodes corresponding with a predetermined future time, wherein the predetermined future time ranges from 60 seconds to 360 seconds;
- computing a schedule eligibility score for each node based on the health score and future resource availability score;
- prioritizing the plurality of nodes based on the schedule eligibility scores; and
- assigning a new job to a node with an assigned priority higher than other nodes of the plurality of nodes.

9. The electronic computing device of claim 8, wherein the memory further comprises instructions, that when executed by the processor, perform the steps of:
- determining a current global resource utilization for each node of the plurality of nodes;
- determining an estimated completion time for one or more currently executing jobs on each node of the plurality of nodes;
- for each of the one or more currently executing jobs that has an estimated completion time that is less than the predetermined future time, computing a job resource utilization; and
- subtracting the job resource utilization from the current global resource utilization for each of the one or more currently executing jobs on each node of the plurality of nodes to derive a future resource availability score for each node of the plurality of nodes.

10. The electronic computing device of claim 9, wherein the memory further comprises instructions, that when executed by the processor, perform the step of determining a health score for each node by determining a current processor utilization and a current memory utilization.

11. The electronic computing device of claim 10, wherein the memory further comprises instructions, that when executed by the processor, perform the steps of determining a memory gradient for each node and penalizing the health score for an increasing memory gradient.

12. The electronic computing device of claim 9, wherein the memory further comprises instructions, that when executed by the processor, perform the steps of determining a node uptime for each node, and penalizing the health score if the node uptime is outside of the predetermined optimal uptime window.

13. The electronic computing device of claim 9, wherein the memory further comprises instructions, that when executed by the processor, perform the steps of determining an estimated completion time for one or more currently executing jobs by determining a stored procedure estimated completion time.

14. The electronic computing device of claim 9, wherein the memory further comprises instructions, that when executed by the processor, perform the steps of:
- retrieving an estimated total completion time for the one or more currently executing jobs from a job completion database;
- determining an elapsed time for the one or more currently executing jobs; and
- subtracting the elapsed time from the estimated total completion time.

15. A computer program product for an electronic computing device comprising a computer readable storage medium having program instructions embodied therewith, the program instructions executable by a processor to cause the electronic computing device to:
- determine a health score for each node of the plurality of nodes,
  - wherein the health score is calculated by multiplying a constant by a penalty, and by subtracting the result of the multiplying from a value that is based, at least in part, on central processing unit idle percentage and memory availability,
  - wherein the constant is set by an administrator input, and
  - wherein the penalty is based, at least in part, on whether uptime is within a predetermined optimal uptime window;
- determine a future resource availability score for each node of the plurality of nodes corresponding with a predetermined future time, wherein the predetermined future time ranges from 60 seconds to 360 seconds;
- compute a schedule eligibility score for each node based on the health score and future resource availability score;
- prioritize the plurality of nodes based on the schedule eligibility scores; and
- assign a new job to a node with an assigned priority higher than other nodes of the plurality of nodes.

16. The computer program product of claim 15, wherein the computer readable storage medium includes program instructions executable by the processor to cause the electronic computing device to:
- determine a current global resource utilization for each node of the plurality of nodes;
- determine an estimated completion time for one or more currently executing jobs on each node of the plurality of nodes;
- for each of the one or more currently executing jobs that has an estimated completion time that is less than the predetermined future time, compute a job resource utilization; and
- subtract the job resource utilization from the current global resource utilization for each of the one or more currently executing jobs on each node of the plurality of nodes to derive a future resource availability score for each node of the plurality of nodes.

17. The computer program product of claim 16, wherein the computer readable storage medium includes program instructions executable by the processor to cause the electronic computing device to:
- determine a node uptime for each node, and
- penalize the health score in response to the node uptime being outside of the predetermined optimal uptime window.

18. The computer program product of claim 16, wherein the computer readable storage medium includes program instructions executable by the processor to cause the electronic computing device to determine an estimated completion time for one or more currently executing jobs by determining a stored procedure estimated completion time.

19. The computer program product of claim 16, wherein the computer readable storage medium includes program instructions executable by the processor to cause the electronic computing device to:
- retrieve an estimated total completion time for the one or more currently executing jobs from a job completion database;
- determine an elapsed time for the one or more currently executing jobs; and
- subtract the elapsed time from the estimated total completion time.

* * * * *